United States Patent Office 3,045,046
Patented July 17, 1962

3,045,046
PREPARATION OF SUBSTITUTED DITHIOBIURETS
Joseph Patrick Brown, Bryn Castell, Geufron, Llangollen, and Ernest Bryson McCall, Llangollen, Wales, assignors to Monsanto Chemicals Limited, London, England, a British company
No Drawing. Filed June 10, 1957, Ser. No. 664,464
3 Claims. (Cl. 260—552)

This invention relates to processes for the preparation of substituted dithiobiurets having biocidal activity, and particularly herbicidal activity, and to new compounds of this class.

Dithiobiuret itself is a compound having the structure $NH_2CSNHCSNH_2$, and various derivatives of it in which the hydrogen atoms are replaced by organic groups are known. The present invention is concerned with processes for the preparation of dithiobiurets in which all the hydrogen atoms of dithiobiuret are replaced by organic groups.

It has unexpectedly been found that when dialkylthiocarbamyl chlorides are mixed with primary arylamines, the major product of the reaction is not the expected mixed thiourea but a symmetrical thiourea derived from two molecules of the amine. Thus when dimethylthiocarbamyl chloride is mixed with p-chloroaniline, symmetrical di-(p-chlorophenyl) thiourea is obtained as the major product instead of the expected N:N-dimethyl-N'-(p-chlorophenyl) thiourea which would result from simple condensation of the two reactants.

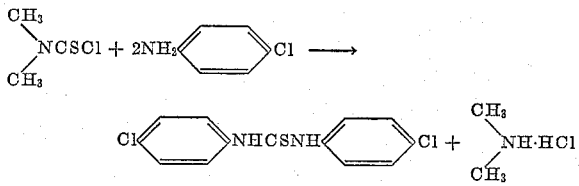

An analogous reaction occurs when p-phenetidine is employed as the amine starting material.

In attempts to obtain the expected unsymmetrical thioureas by modifying the conditions of reaction, it has been further discovered that if a tertiary amine is present as hydrogen chloride acceptor, reaction proceeds with the formation of dithiobiurets, and this discovery provides a new method of obtaining compounds of this type. For example, p-chloroaniline reacts to give N:N:N'':N''-tetramethyl-N'-(p-chlorophenyl)dithiobiuret, and p-phenetidine gives the corresponding p-ethoxyphenyl compound.

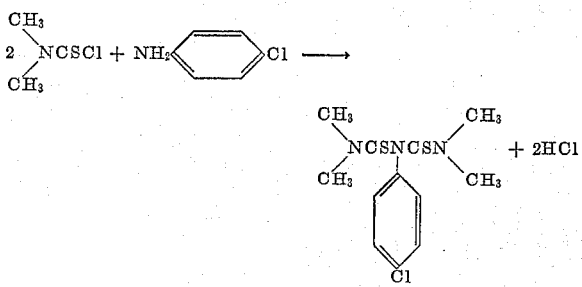

The process of the present invention is accordingly one for the preparation of substituted dithiobiurets in which a dialkylthiocarbamyl chloride is reacted with a primary arylamine in the presence of a tertiary amine.

Suitable dialkylthiocarbamyl chlorides are dimethyl and diethyl thiocarbamyl chlorides. Compounds of this class are readily obtainable by direct chlorination with chlorine or sulphuryl chloride of the corresponding symmetrical thiuram disulphides, some of which are well known commercially as rubber vulcanisation accelerators. Thus dimethylthiocarbamyl chloride is readily obtained by the reaction of chlorine with tetramethylthiuram disulphide, an important vulcanisation accelerator; it can also be obtained by the action of phosgene on dimethylamine.

Suitable as primary arylamines for use in the reaction are aniline, β-naphthylamine, o-chloroaniline, p-chloroaniline, 2:4-dichloroaniline, 3:4-dichloroaniline, o-anisidine, p-anisidine, o-phenetidine, p-phenetidine, and p-nitraniline.

Pyridine is a very suitable tertiary amine for use as the hydrogen chloride acceptor, and other tertiary amines which can be used are trimethylamine, triethylamine, dimethylaniline, quinoline, isoquinoline, and dimethylbenzylamine. In practice the tertiary amine will always, of course, be one free from reactive hydrogen atoms which would interfere in the process by reaction with the thiocarbamyl chloride.

The reaction is carried out by mixing the dialkylthiocarbamyl chloride and the primary arylamine in the presence of the tertiary amine, and heating if necessary. The reaction can be carried out in an inert solvent, such as toluene, if desired. Each mole proportion of primary amine requires substantially two molecular proportions of dialkyl dithio carbamyl chloride, and at least one molecular proportion of tertiary amine is preferably used for each one of dialkyldithiocarbamyl chloride, for otherwise the product is contaminated more than can be avoided with the unwanted symmetrical thiourea. When reaction is complete the dithiobiuret produced can be isolated and purified by crystallisation from a suitable solvent. Methanol is usually suitable for this crystallisation.

The invention also includes as new compounds N:N:N'':N''-tetramethyldithiobiurets in which the central nitrogen (N') is substituted by an aryl group.

The invention is illustrated by the accompanying examples.

Example 1

A solution of p-chloroaniline (2.5 g., 0.02 g. mol.) in toluene (5 cc.) was mixed with a solution of N:N-dimethylthiocarbamyl chloride (2.4 g., 0.02 g. mol.) and pyridine (2 g., 0.025 g. mol.) in toluene (10 cc.). Reaction took place on standing at room temperature. After standing 16 hours, water (20 cc.) was mixed with the resulting solution and the toluene layer was then separated. Solvent was removed from the toluene layer by evaporation, leaving a semi-solid product which was crystallised from methanol, giving N:N:N'':N''-tetramethyl-N'-(p-chlorophenyl) dithiobiuret (1.0 g.) as shining cream leaflets, M.P. 142° C. (Found: C, 48.2%, H 5.5%, N 13.7%, Cl 11.5%, S 21.3%. $C_{12}H_{16}N_3ClS_2$ requires: C 47.9%, H 5.3%, N 13.9%, Cl 11.8%, S 21.2%.)

Example 2 p-Phenetidine (0.9 g., 0.0065 g. mol.) was added to a mixture of N:N-dimethylthiocarbamyl chloride (2 g., 0.016 g. mol.) and pyridine (2 g., 0.025 g. mol.). The mixture was warmed to 45° C. and then allowed to stand at room temperature for 16 hours, after which the product was stirred with water (20 cc.) and the aqueous liquors decanted from the sticky solid remaining.

The solid residue was crystallised from methanol, giving crystals of N:N:N'':N''-tetramethyl-N'-(p-ethoxyphenyl)dithiobiuret (1.0 g.). Recrystallisation from methanol gave squat cream prisms, M.P. 130–1° C. (Found: C 54.6%, H 6.8%. $C_{14}H_{21}N_3OS_2$ requires: C 54.0%, H 6.8%.)

What we claim is:
1. A method of preparing N,N,N'',N''-tetraalkyl N' aryl dithiobiuret which comprises mixing an aryl amine having the molecular structure:

$$R_n\text{---}R'\text{---}NH_2$$

wherein R is a radical selected from the group consisting of nitro, ethoxy, methoxy and chlorine; wherein $n$ is an integer from zero to two, and wherein R' is an aromatic hydrocarbon radical; with approximately two molecular proportions of a dialkylthiocarbamyl chloride wherein the alkyl radical has up to two carbon atoms, said mixture being effected in the presence of a tertiary amine inert with respect to the mixed reagents but capable of forming salts with hydrogen chloride.

2. The method of preparing N,N,N'',N'''-tetramethyl N' (p-chlorophenyl) dithiobiuret which comprises heating p-chloroaniline with approximately two molecular proportions of N,N-dimethylthio carbamyl chloride in the presence of an excess of pyridine and an inert solvent on separating the resultant product.

3. The method of preparing N,N,N'',N'''-tetramethyl N'-(p-ethoxyphenyl) dithiobiuret which comprises heating p-phenetidine and approximately two mols of N,N-dimethylthiocarbamyl chloride and an excess of pyridine, adding water to dissolve the pyridine salt and separating the product.

References Cited in the file of this patent

UNITED STATES PATENTS

| | | |
|---|---|---|
| 2,661,272 | Searle | Dec. 1, 1953 |
| 2,723,192 | Todd | Nov. 8, 1955 |

FOREIGN PATENTS

| | | |
|---|---|---|
| 808,710 | Germany | July 19, 1951 |